United States Patent [19]

Fijisawa et al.

[11] 4,005,262
[45] Jan. 25, 1977

[54] BRIGHTNESS AND CONTRAST CONTROL FOR TELEVISION RECEIVER

[75] Inventors: Seiji Fijisawa, Ikoma; Norio Meki, Takatsuki; Hiroyuki Irie, Osaka, all of Japan

[73] Assignee: Matsushita Electric Industrial Co., Ltd., Osaka, Japan

[22] Filed: July 21, 1975

[21] Appl. No.: 597,332

Related U.S. Application Data

[63] Continuation-in-part of Ser. No. 375,921, July 2, 1973, abandoned.

[30] Foreign Application Priority Data

June 30, 1972 Japan .............................. 47-66141
June 30, 1972 Japan .............................. 47-66142

[52] U.S. Cl. .............................. 358/168; 358/169
[51] Int. Cl.$^2$ ......................................... H04N 5/58
[58] Field of Search ....... 178/7.3 R, 7.3 DC, 7.5 R, 178/7.5 DC

[56] References Cited
FOREIGN PATENTS OR APPLICATIONS
812,982  5/1969  Canada .................. 179/7.5 DC Primary Examiner—George G. Stellar
Attorney, Agent, or Firm—Stevens, Davis, Miller & Mosher

[57] ABSTRACT

A television receiver having a picture control circuit permitting simultaneous control of both brightness and contrast and means for controlling contrast alone without varying brightness so that the character of the reproduced picture may be controlled to suit a viewer's taste.

8 Claims, 9 Drawing Figures

BRIGHTNESS AND CONTRAST CONTROL FOR TELEVISION RECEIVER

CROSS-REFERENCE TO THE RELATED APPLICATION

This is a continuation-in-part of Application Ser. No. 375921, filed on July 2, 1973 and now abandoned.

This invention relates to a television receiver provided with means for permitting simultaneous control of both brightness and contrast and means for controlling contrast alone.

Figure 1:
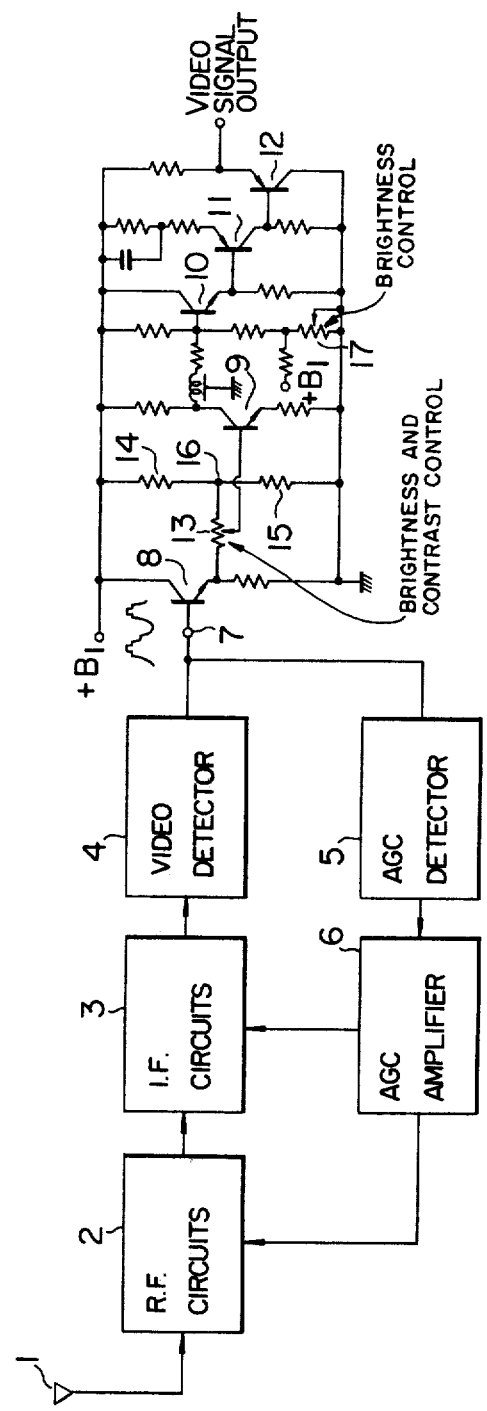
FIG. 1 is a circuit diagram showing part of a television receiver circuit having control means different from the circuit according to the invention.

There has been contemplated a television receiver having a picture control circuit permitting simultaneous control of both brightness and contrast and a brightness sub-control circuit enabling control of brightness alone, as typically shown in FIG. 1. In the figure, signals intercepted by an antenna 1 are applied to a television receiver radio frequency (R.F.) circuits 2 which may include a usual tuning means, radio frequency amplifiers, a mixer, and an oscillator, and intermediate frequency (I.F.) circuits 3 which may include an intermediate frequency amplifier. The received R.F. signal may be amplified in the R.F. amplifier and is heterodyned with the local oscillator signal in the mixer stage to provide a corresponding signal of intermediate frequency. After amplification, the I.F. signal is applied to a video detector 4 where the intermediate frequency signal is detected before being supplied to a video signal input terminal 7. An automatic-gain-control (A.G.C.) system which may include an A.G.C. detector 5 and A.G.C. amplifiers 6 controls the degree of amplification required in the R.F. and I.F. amplifier to maintain approximately constant detector output level irrespective of variations in the strength of the received signal. Numerals 8 to 12 designate transistors for video amplification.

In this video amplifier, a negative polarity video signal supplied to the terminal 7 is amplified through the transistor 8 for impedance conversion, whose output is added at the base of the transistor 9 through a variable register 13. The output of the transistor 9 is amplified through the transistor 10 for impedance matching, whose output is added to the transistor 11 to obtain a positive polarity video signal. The output of the transistor 11 is supplied to the transistor 12 for impedance conversion prior to being supplied to the next stage.

The operation of the picture control circuit will now be explained. The variable register 13 and resistors 14 and 15 are provided between the transistors 8 and 9. The resistors 14 and 15 serve to determine the a-c impedance and d-c potential at the connection point 16 between them. In other words, the d-c potential on the connection point 16 can determine the d-c reference level at the time of varying the amplitude by varying the position of the slide terminal of the variable resistor 13; that is; the amplitude can be varied with respect to the black level. Thus, the reference d-c level at the connection point 16 may be set such that the black level will not be changed by varying the variable resistor 13.

Figure 2:
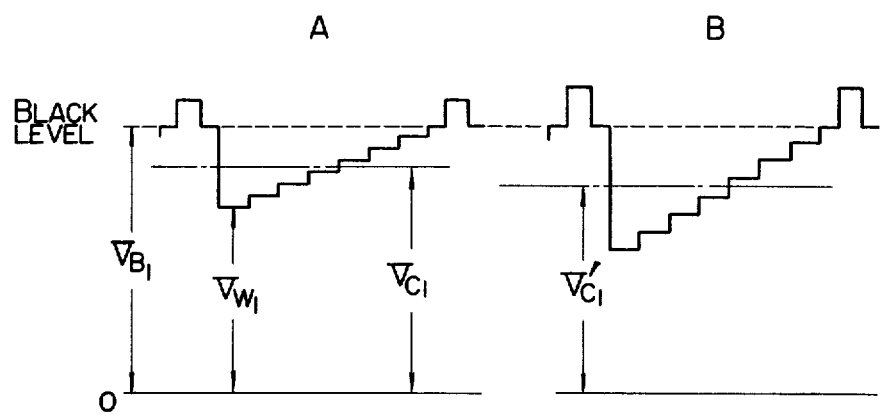
FIGS. 2 and 3 show waveforms for illustrating the operation of the circuit of FIG. 1.

FIG. 2 shows examples of the voltage waveform of the base signal of the transistor 9 for different positions of the slide tap of the variable resistor 13 for the picture adjustment. In the figure, $V_{B1}$ indicates the black level, and $V_{W1}$ indicates the white peak level. The voltage waveform in A is obtained when the a-c impedance is minimum; that is; the slide terminal of the variable resistor 13 is positioned near the connection point 16, and the average-value of the black and white levels of the video signals appearing at the base of the transistor 9 is shown as a d-c potential $V_{c1}$.

The voltage waveform in B results when the a-c impedance is maximum; that is; the slide terminal of the variable resistor 13 is positioned near the emitter of the transistor 8. In this case, the average d-c voltage level is a voltage $V'_{c1}$ lower than the voltage $V_{c1}$ in A. It will be seen from these waveforms that while the video signal is varied with respect to the black level $V_{B1}$, the d-c potential between the black and white levels of the video signal at the base of the transistor 9 can be varied with the resistance of the variable resistor 13. Thus, picture control by simultaneously varying both brightness and contrast can be obtained.

With this picture control circuit, however, it is difficult to solve problems based on the difference in the taste of viewers, for instance one viewer may desire black picture elements as being shifted to a gray shade. This problem has been solved, as shown in FIG. 1, by connecting a variable resistor 17 having the function of a brightness sub-control to the base of the transistor 10.

With such brightness sub-control system, however, it is impossible to meet the taste for any desired shade of the picture with the maximum brightness since the beam current for the maximum brightness is predetermined by the ratings of the picture tube and other factors.

Figure 3:
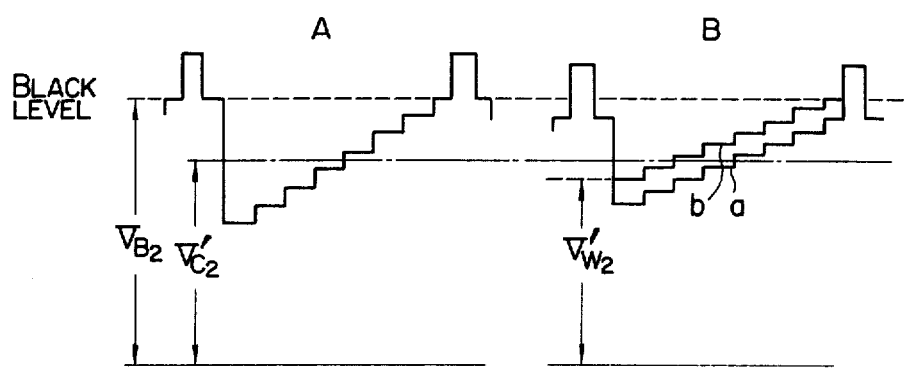

This aspect will be discussed in further detail with reference to FIG. 3 showing waveforms of the video signal at the collector of the transistor 11. Waveform A in FIG. 3 is assumed to be obtained when the picture control circuit and brightness subcontrol circuit are set for the maximum picture tube beam current. In this state, the brightness cannot be increased any further to meet a viewer's taste for seeing black picture parts as a gray shade rather than black because the variable resistor 17 is set to a position corresponding to the maximum beam current.

In order to be more or less able to meet the taste of all viewers, therefore, it is necessary to preset for a reduced amplitude or voltage interval between the black level and white peak level of the video signal. For instance, for a waveform a in B of FIG. 3, with the same average-value level $V'_{c2}$ as that of the voltage in A of FIG. 3; that is, with the maximum beam current. In such case, for reproducing black picture elements as black, it is necessary to slightly reduce brightness by the brightness subcontrol or variable resistor 17 to obtain a waveform b; that is, it is inevitable that the picture is slightly darkened.

The present invention is intended to overcome the afore-mentioned inconvenience.

An object of the invention is to permit obtaining picture reproduction of a character suited to the viewer's taste by providing means for simultaneously controlling both brightness and contrast and means for controlling contrast alone.

Another object of the invention is to permit picture reproduction of a desired character with the maximum brightness.

A further object of the invention is to permit connection of the picture control circuit to the transistor circuit for processing the video signal with a single lead.

With the television receiver according to the invention which is provided with means for simultaneously controlling both brightness and contrast and means for controlling contrast alone, it is possible to solve the problem of meeting a variety of tastes of television viewers without varying the brightness; for instance, with the maximum brightness determined by the ratings of the picture tube.

Also, in the television receiver according to the invention, the means for simultaneously controlling both brightness and contrast comprises a circuit for combining a video signal and a blanking pulse signal, a transistor receiving at the base the resultant signal output of the combining circuit and a picture control circuit having a variable resistor and a capacitor connected to the emitter of the transistor for controlling the a-c gain, so that the picture control circuit can be connected to the video amplifier circuit consisting of transistors only at one point.

Further in the television receiver according to the invention, a contrast sub-control circuit for varying contrast alone is provided in addition to the picture control circuit.

The invention will now be described in conjunction with preferred embodiments thereof with reference to the drawings.

Figure 4:
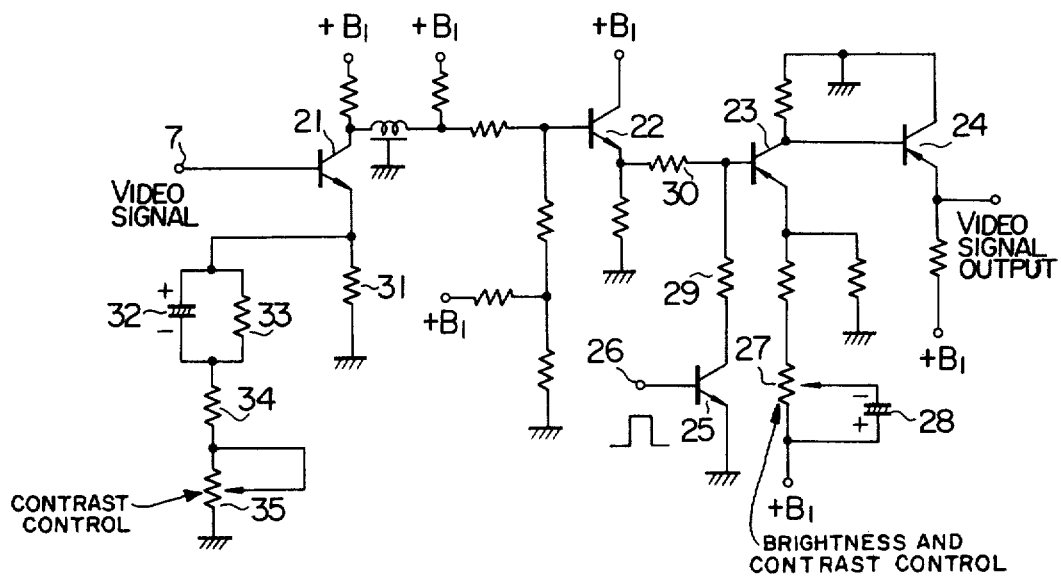
FIG. 4 is a circuit diagram showing part of an embodiment of the television receiver according to the invention.

FIG. 4 shows an embodiment of the invention. In the Figure, numeral 7 designates the terminal to which video signals are supplied through the video detector 4 shown in FIG. 1, numerals 21 to 24 transistors for video amplification, and numeral 25 a transistor for amplifying horizontal and vertical blanking pulses supplied to a terminal 26. In this embodiment, moreover, a series circuit consisting of a parallel circuit of capacitor 32 and resistor 33, a resistor 34 and a variable resistor 35 is connected in parallel with the emitter resistor 31 of the transistor 21 and which constitutes a contrast sub-control circuit.

In this circuit, a negative polarity video signal supplied to the terminal 7 is amplified through the transistor 21 to obtain a positive polarity video signal which is supplied to the base of the transistor 22, whose output is added at the base of transistor 23 with the blanking pulse which come from the terminal 26 and is then amplified through the transistor 25. The output of the transistor 23 is supplied to the transistor 24 for impedance conversion prior to being supplied to the next stage.

Figure 5:
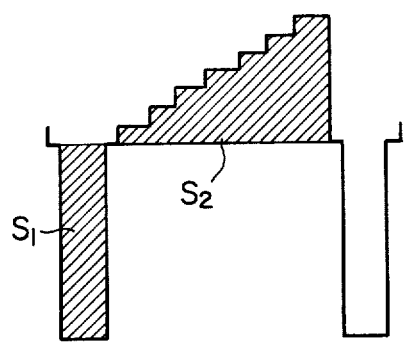
FIGS. 5 to 7 show waveforms for illustrating the operation of the embodiment of FIG. 4.

The operation of the picture control circuit will now be explained. The signal added to the base of the transistor 23 is a composite signal consisting of the positive polarity video signal from the transistor 22 and the blanking pulse signal from the transistor 25, as is shown in FIG. 5. The resistance 29 connected to the collector of the transistor 25 and the resistance 30 connected between the emitter of the transistor 22 and the base of the transistor 23 are set such that in a horizontal line, an area $S_1$ of the blanking pulse is equal to an area $S_2$ of the video signal. In practice, $S_1$ is made equal to $S_2$ by setting the amplitude of the horizontal blanking pulse to about 4 to 5 times the average amplitude of the video signal.

Figure 6:
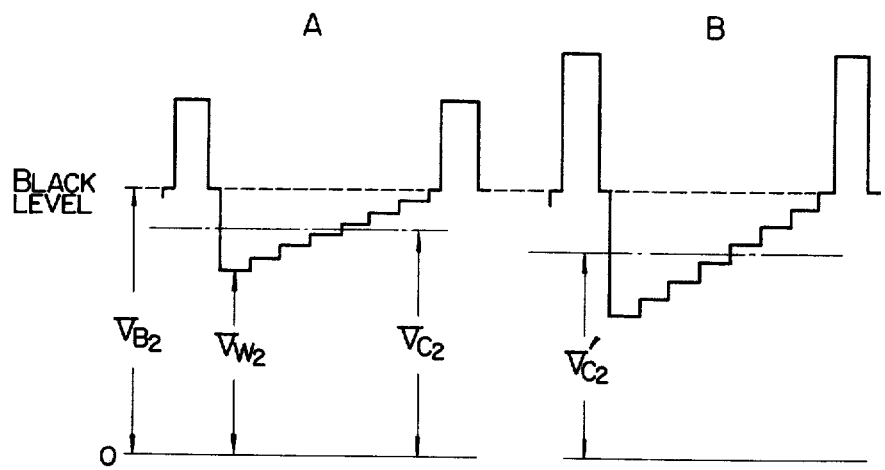

FIG. 6 shows examples of the voltage waveform of the collector signal of the transistor 23 for different positions of the slide tap of the variable resistor 27 for the picture adjustment. In the Figure, $V_{B2}$ indicates the black level, and $V_{W2}$ indicates the white peak level. The voltage waveform in A is obtained when the a-c gain is minimum, and the average-value of the black and white levels of the video signals appearing at the collector of the transistor 23 is shown as a d-c potential $V_{C2}$. The voltage waveform in B results when the a-c gain is maximum with the variable resistor 27 bypassed with the capacitor 28. In this case, the average d-c voltage level is a voltage $V'_{C2}$ lower than the voltage $V_{C2}$ in A. It will be seen from these waveforms that while the composite signal including the blanking pulse signal is amplified with respect to the black level $V_{B2}$, the d-c potential between the black and white levels of the video signal at the collector of the transistor 23 can be varied with the resistance of the variable resistor 27. Thus, picture control by simultaneously varying both brightness and contrast can be obtained very simply.

The operation of the contrast sub-control circuit will now be explained in FIG. 4.

If the resistance of the resistor 33 is infinite, this contrast sub-control circuit is equivalent to the usual contrast control system, permitting the variation of contrast alone without varying brightness. If the resistor 33 has an adequate resistance in parallel with the capacitor 32, by varying the variable resistance 35 it is possible to vary, although to a slight extent, the d-c gain together with the a-c gain for the output at the collector of the transistor 21, so that d-c component reproduction can be improved.

Figure 7:
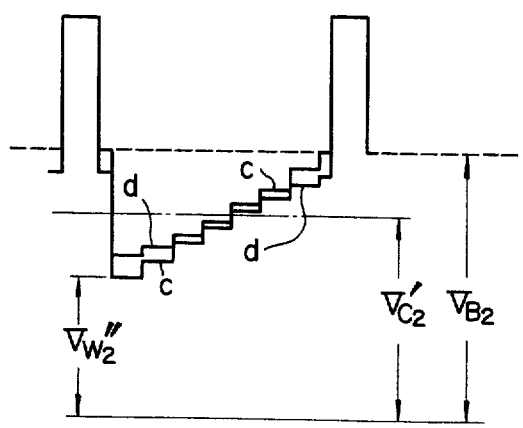

With this circuit, it is possible to change black color to a gray shade without varying the beam current by manipulating the variable resistor 35. For example, by operating the variable resistor 35 a waveform $c$ in FIG. 7 which corresponds to the waveform in A of FIG. 3 may be changed to a waveform $d$. A similar function can also be obtained in the case of the waveforms in B of FIG. 3. In this case, the waveform $d$ in FIG. 7 corresponds to the waveform $a$ in B of FIG. 3, and the waveform $c$ in FIG. 7 corresponds to the waveform in A of FIG. 3. It will be seen that in this case it is possible to reproduce the black picture part from a signal for black without changing the beam current.

Figure 8:
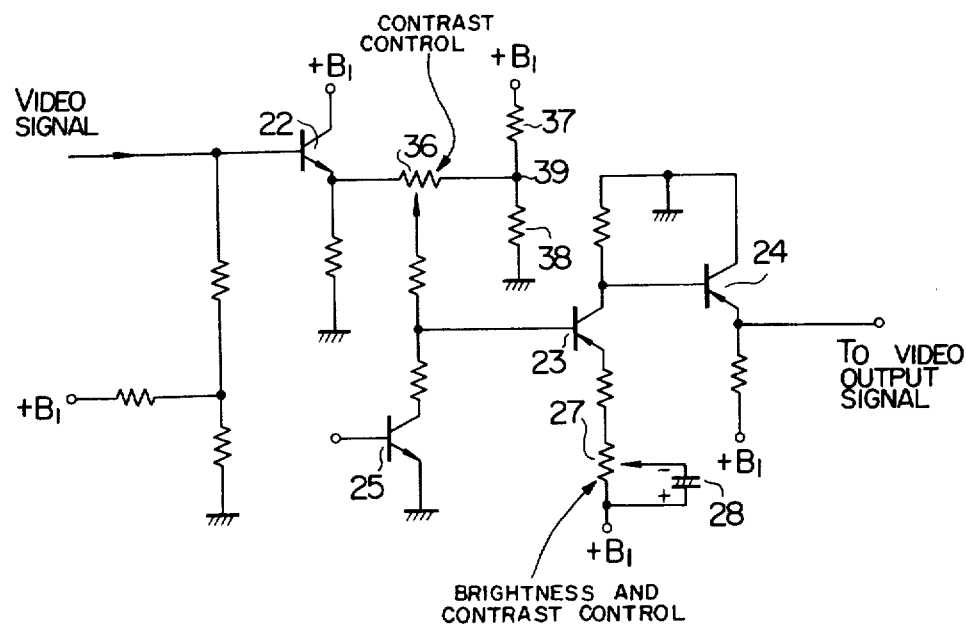
FIG. 8 is a circuit diagram showing an essential portion of another embodiment of the invention.

FIG. 8 shows another embodiment, which can provide the same effect as that of the preceding embodiment. In FIG. 8, transistors 22 to 25, variable resistor 27 and capacitor 28 are the same as corresponding elements shown in FIG. 4. In this embodiment, however, a variable resistor 36 and resistors 37 and 38 are provided between the transistors 22 and 23. The resistors 37 and 38 serve to determine the a-c impedance and d-c potential at the connection point 39 between them. In other words, the d-c potential at the connection point can determine the d-c reference level at the time of varying the amplitude by varying the position of the slide terminal of the variable resistor 36; that is, the amplitude can be varied with respect to the black level or white level. Thus, for obtaining variation of contrast alone, that is, for obtaining the function as a contrast sub-control, the reference d-c level at the connection point 39 may be set such that brightness will not change by varying the variable resistance 36. In this case, the difference from the brightness sub-control system can be shown in the same way for the previous embodiment.

Figure 9:
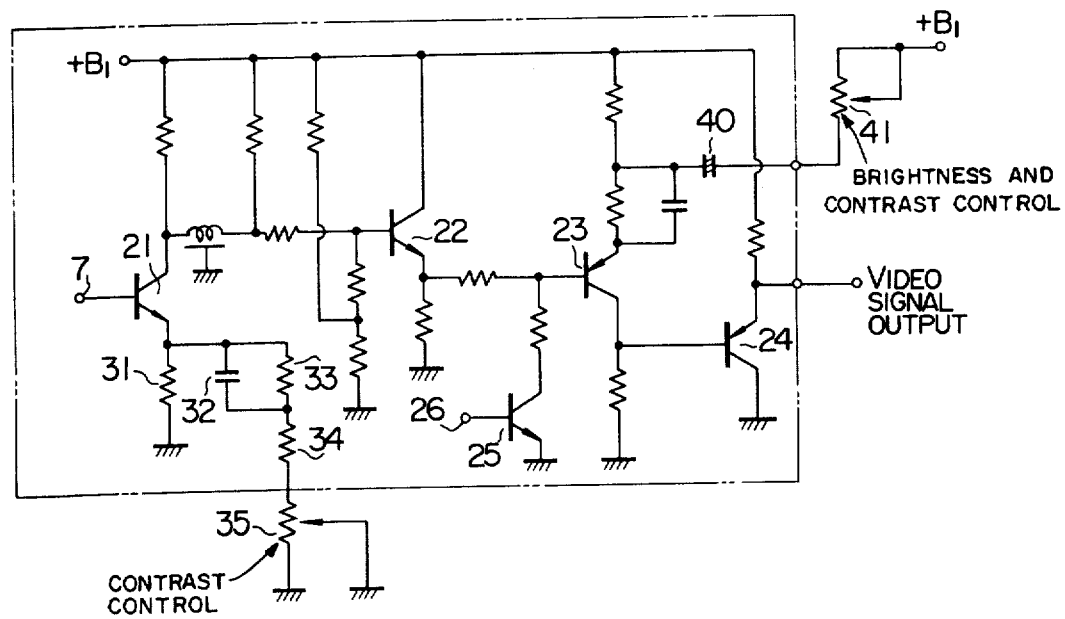
FIG. 9 is a circuit diagram showing an essential portion of a further embodiment of the invention.

FIG. 9 shows a modification of the circuit of FIG. 4. In this Figure, parts 7, 21 to 26 and 31 to 35 correspond to those of like reference numerals in FIG. 4. In this circuit, however, there is provided a variable resistor 41, whose one terminal and slide terminal are connected to a voltage source +B₁ and whose other terminal is connected to a capacitor 40 in the emitter circuit of the transistor 23.

This variable resistor 41 provides for simultaneous control of both brightness and contrast and corresponds to the variable resistor 27 in the circuit of FIG. 4. This variable resistor 41, however, requires only a single lead for connection to the transistor circuit section for processing the video signal, which is advantageous from the standpoint of facilitating the manufacture of the receiver. In FIG. 9, the elements shown as enclosed with alternate long and two short dashes line are arranged and wired on one and the same printed circuit board.

What is claimed is:

1. A television receiver of the type including an automatic gain control circuit having a video amplifier circuit provided with means for simultaneously varying both brightness and contrast and means for varying contrast alone, wherein said means for simultaneously varying both brightness and contrast comprises a circuit for combining a video signal and a blanking pulse signal having the same polarity as a sync signal of the video signal and having an amplitude within the range from 3 to 6 times as large as that of the video signal, a first transistor receiving at a base thereof an output of said combining circuit and producing at a collector thereof an output signal, and a picture control circuit having a variable resistor and a capacitor, said picture control circuit being connected to an emitter of said first transistor for controlling an a-c signal gain, and wherein said means for varying contrast alone comprises a second transistor for amplifying the video signal and a means for varying the amplification degree of an amplifier circuit constituted by said second transistor, an output of said second transistor being applied as a video signal to said combining circuit.

2. A television receiver of the type including an automatic gain control circuit having a video amplifier circuit provided with means for simultaneously varying both brightness and contrast and means for varying contrast alone, wherein said means for simultaneously varying both brightness and contrast comprises a circuit for combining a video signal and a blanking pulse signal having the same polarity as a sync signal of the video signal and having an amplitude within the range from three to six times as large as that of the video signal, a first transistor receiving at a base thereof an output of said combining circuit and producing at a collector thereof an output signal, and a picture control circuit having a variable resistor and a capacitor, said picture control circuit being connected to an emitter of said first transistor for controlling an a-c signal gain.

3. A television receiver according to claim 2, wherein said picture control circuit has said capacitor connected at one end thereof to the emitter of said first transistor and at the other end thereof to one of fixed terminals of said variable resistor and has said variable resistor connected at the other one of the fixed terminals thereof and also at a movable terminal thereof to a voltage source.

4. A television receiver according to claim 2, wherein said means for simultaneously varying both brightness and contrast comprises a circuit for combining a video signal and a blanking pulse signal having the same polarity as a sync signal of the video signal and having an amplitude within the range from three to six times as large as that of the video signal, a first transistor receiving at a base thereof an output of said combining circuit and producing at a collector thereof an output signal, and a picture control circuit having a variable resistor and a capacitor, said picture control circuit being connected to an emitter of said first transistor for controlling an a-c signal gain, and wherein said means for varying contrast alone comprises a second transistor for amplifying the video signal and a means for varying the amplification degree of an amplifier circuit constituted by said second transistor, an output of said second transistor being applied as a video signal to said combining circuit.

5. A video amplifier circuit for a television receiver of the type including an automatic gain control circuit comprising an amplifier including a first transistor for receiving an input video signal having a sync component at its base, and a contrast control circuit including a first variable resistor coupled to the emitter of said first transistor, and a combining circuit including a second transistor having its base coupled to the collector of said first transistor; means coupling a blanking pulse signal to the base of said second transistor, said blanking pulse having the same polarity as said sync component of the video signal and having an amplitude within the range from three to six times as large as that of said video signal; and a picture control circuit including a second variable resistor and a first capacitor connected to the emitter of said second transistor for controlling the a-c signal gain, said second variable resistor varying both brightness and contrast and said first variable resistor varying contrast alone.

6. A video amplifier circuit as defined by claim 5 wherein said contrast control circuit further includes a second capacitor coupled between the emitter of said first transistor and said first variable resistor.

7. A video amplifier circuit as defined by claim 6 wherein a third resistor is connected across said second capacitor.

8. A video amplifier circuit as defined by claim 5 wherein said second variable resistor has first and second fixed terminals and a movable terminal, and wherein said first capacitor is coupled in series with the first terminal of said second variable resistor and the emitter of said second transistor, said second fixed and movable terminals of said second variable resistor being coupled to a voltage source.

* * * * *